(12) United States Patent
Sibley et al.

(10) Patent No.: US 7,757,267 B2
(45) Date of Patent: *Jul. 13, 2010

(54) METHOD FOR DELIVERING CABLE CHANNELS TO HANDHELD DEVICES

(75) Inventors: Erin Hall Sibley, Los Angeles, CA (US); Paul Damian Tarbuck, Hawthorne, CA (US)

(73) Assignee: The Boeing Company, Chicago, IL (US)

( * ) Notice: Subject to any disclaimer, the term of this patent is extended or adjusted under 35 U.S.C. 154(b) by 1252 days.

This patent is subject to a terminal disclaimer.

(21) Appl. No.: 10/700,089

(22) Filed: Nov. 3, 2003

(65) Prior Publication Data

US 2006/0048208 A1 Mar. 2, 2006

Related U.S. Application Data

(63) Continuation-in-part of application No. 10/409,875, filed on Apr. 9, 2003, now Pat. No. 7,584,493.

(60) Provisional application No. 60/376,084, filed on Apr. 29, 2002.

(51) Int. Cl.
*H04N 7/16* (2006.01)
(52) U.S. Cl. .................. 725/153; 725/136; 725/63; 725/105; 725/117
(58) Field of Classification Search .............. 725/153, 725/136, 63
See application file for complete search history.

(56) References Cited

U.S. PATENT DOCUMENTS

| | | | |
|---|---|---|---|
| 5,655,214 A * | 8/1997 | Mullett | 725/78 |
| 5,917,467 A * | 6/1999 | Yoshimura | 345/581 |
| 5,940,776 A | 8/1999 | Baron et al. | |
| 5,982,363 A | 11/1999 | Naiff et al. | |
| 5,990,927 A | 11/1999 | Hendricks et al. | |
| 6,040,851 A * | 3/2000 | Cheng et al. | 725/132 |
| 6,219,537 B1 | 4/2001 | James et al. | |
| 6,278,733 B1 * | 8/2001 | Bennett et al. | 375/240 |
| 6,396,544 B1 * | 5/2002 | Schindler et al. | 348/461 |
| 6,476,825 B1 * | 11/2002 | Croy et al. | 715/716 |
| 6,556,251 B1 * | 4/2003 | Sorensen | 348/564 |

(Continued)

FOREIGN PATENT DOCUMENTS

EP 0 491 068 6/1992

(Continued)

OTHER PUBLICATIONS

Patent Abstracts of Japan, vol. 017, No. 296 (P-1551), Jun. 7, 1993 & JP 05 020272 (Sony Corp.) Jan. 29, 1993, English translation.

(Continued)

*Primary Examiner*—Joseph P Hirl
*Assistant Examiner*—Jivka Rabovianski
(74) *Attorney, Agent, or Firm*—Gates & Cooper LLP

(57) ABSTRACT

A method, apparatus, and article of manufacture provide the ability to broadcast premium video programming. Thus, once premium video programming is received, it is encoded into the vertical blanking interval and unused/non-interfering Active lines found in a typical television broadcast. However, the encoded information is completely transparent to the pre-existing/typical television channel. The resulting encoded content is then broadcast with the typical television broadcast.

15 Claims, 9 Drawing Sheets

U.S. PATENT DOCUMENTS

| | | | |
|---|---|---|---|
| 6,901,606 B2 * | 5/2005 | Wright et al. | 725/151 |
| 7,020,839 B1 * | 3/2006 | Hosoda | 715/523 |
| 2001/0029610 A1 * | 10/2001 | Corvin et al. | 725/42 |
| 2001/0039180 A1 | 11/2001 | Sibley et al. | |
| 2001/0039662 A1 | 11/2001 | Sibley | |
| 2001/0039663 A1 | 11/2001 | Sibley | |
| 2001/0039664 A1 | 11/2001 | Sibley | |
| 2001/0053700 A1 | 12/2001 | Sibley | |
| 2002/0012347 A1 * | 1/2002 | Fitzpatrick | 370/392 |
| 2002/0016820 A1 * | 2/2002 | Du Val et al. | 709/203 |
| 2002/0018568 A1 | 2/2002 | Weaver, III et al. | |
| 2002/0019987 A1 * | 2/2002 | James et al. | 725/136 |
| 2002/0027562 A1 * | 3/2002 | Kimble et al. | 345/629 |
| 2002/0065678 A1 * | 5/2002 | Peliotis et al. | 705/1 |
| 2002/0080161 A1 * | 6/2002 | St. Maurice et al. | 345/719 |
| 2002/0129374 A1 * | 9/2002 | Freeman et al. | 725/91 |
| 2002/0145621 A1 * | 10/2002 | Nguyen | 345/718 |
| 2002/0196364 A1 * | 12/2002 | Hendricks | 348/468 |
| 2003/0023988 A1 * | 1/2003 | Lee et al. | 725/143 |
| 2003/0097657 A1 * | 5/2003 | Zhou et al. | 725/46 |
| 2003/0171985 A1 * | 9/2003 | Prabhu et al. | 705/14 |
| 2003/0188320 A1 * | 10/2003 | Shing | 725/131 |
| 2003/0204845 A1 | 10/2003 | Sibley et al. | |
| 2004/0078824 A1 * | 4/2004 | Krisbergh et al. | 725/105 |
| 2004/0100588 A1 * | 5/2004 | Hartson et al. | 348/608 |
| 2004/0133919 A1 * | 7/2004 | Incentis | 725/112 |
| 2004/0139469 A1 * | 7/2004 | Incentis Carro | 725/91 |
| 2004/0139474 A1 * | 7/2004 | Carro | 725/112 |
| 2005/0108762 A1 * | 5/2005 | Chao et al. | 725/81 |
| 2005/0229213 A1 * | 10/2005 | Ellis et al. | 725/58 |
| 2006/0137028 A1 * | 6/2006 | Evans et al. | 726/29 |
| 2007/0016847 A1 * | 1/2007 | Reichardt et al. | 715/500.1 |

FOREIGN PATENT DOCUMENTS

| | | |
|---|---|---|
| EP | 1 152 614 | 11/2001 |
| WO | WO 01/97525 | 12/2001 |
| WO | WO 02/065772 | 8/2002 |

OTHER PUBLICATIONS

Non-Final Office Action dated Aug. 9, 2007 in U.S. Appl. No. 10/409,875, filed Apr. 9, 2003 by Erin H. Sibley.

Final Office Action dated Jan. 14, 2008 in U.S. Appl. No. 10/409,875, filed Apr. 9, 2003 by Erin H. Sibley.

Examiner's Interview Summary Record dated Mar. 27, 2008 in U.S. Appl. No. 10/409,875, filed Apr. 9, 2003 by Erin H. Sibley.

Non-Final Office Action dated Apr. 30, 2008 in U.S. Appl. No. 10/409,875, filed Apr. 9, 2003 by Erin H. Sibley.

Non-Final Office Action dated Oct. 20, 2008 in U.S. Appl. No. 10/409,875, filed Apr. 9, 2003 by Erin H. Sibley.

Amendment Under 37 C.F.R. 1.111 filed Oct. 30, 2007 in U.S. Appl. No. 10/409,875, filed Apr. 9, 2003 by Erin H. Sibley.

Amendment Under 37 C.F.R. 1.114 filed Mar. 20, 2008 in U.S. Appl. No. 10/409,875, filed Apr. 9, 2003 by Erin H. Sibley.

Amendment Under 37 C.F.R. 1.111 filed Jul. 30, 2008 in U.S. Appl. No. 10/409,875, filed Apr. 9, 2003 by Erin H. Sibley.

* cited by examiner

METHOD FOR DELIVERING CABLE CHANNELS TO HANDHELD DEVICES

CROSS-REFERENCE TO RELATED APPLICATIONS

This application is a continuation-in-part application and claims the benefit under 35 U.S.C. Section 120 of the following commonly-assigned U.S. utility patent application, which is incorporated by reference herein:

Utility application Ser. No. 10/409,875, filed Apr. 9, 2003, now U.S. Pat. No. 7,584,493 by Erin H. Sibley and Paul Damian Tarbuck, entitled "RECEIVER CARD TECHNOLOGY FOR A BROADCAST SUBSCRIPTION VIDEO SERVICE", which application claims priority to Provisional Application Ser. No. 60/376,084, filed Apr. 29, 2002, by Erin H. Sibley and Paul Damian Tarbuck, entitled "RECEIVER CARD TECHNOLOGY FOR A BROADCAST SUBSCRIPTION VIDEO SERVICE";

This application is related to the following co-pending utility patent applications, which are incorporated by reference herein:

Utility application Ser. No. 09/844,919, filed Apr. 26, 2001, by Erin H. Sibley, entitled "COMMUNICATION SYSTEM WITH SECONDARY CHANNEL REBROADCASTING WITHIN A LOCAL AREA NETWORK";

Utility application Ser. No. 09/844,976, filed Apr. 26, 2001, by Erin H. Sibley, entitled "DIGITAL OVER-THE-AIR COMMUNICATION SYSTEM FOR USE WITH ANALOG TERRESTRIAL BROADCASTING SYSTEM";

Utility application Ser. No. 09/844,932, filed Apr. 26, 2001, by Erin H. Sibley, entitled "PORTABLE DEVICE FOR USE WITH DIGITAL OVER-THE-AIR COMMUNICATION SYSTEM FOR USE WITH TERRESTRIAL BROADCASTING SYSTEM";

Utility application Ser. No. 09/844,923, filed Apr. 26, 2001, by Erin H. Sibley, entitled "DIGITAL OVER-THE-AIR COMMUNICATION SYSTEM FOR USE WITH DIGITAL TERRESTRIAL BROADCASTING SYSTEM";

Utility application Ser. No. 09/844,920, filed Apr. 26, 2001, by Erin H. Sibley and Michael W. Sales, entitled "COMMUNICATION SYSTEM FOR REBROADCASTING ELECTRONIC CONTENT WITHIN LOCAL AREA NETWORK";

Utility application Ser. No. 09/564,082, filed May 3, 2000;

U.S. Provisional Patent Application Ser. No. 60/249,153 (PD-200352) filed on Nov. 16, 2000, entitled "Mobile Multimedia Subscription Programming Delivery System";

U.S. Provisional Patent Application Ser. No. 60/268,482 (PD-201027) filed on Feb. 12, 2001, entitled "Portable Handheld Devices to Receive Digital Over The Air Broadcasts";

U.S. Provisional Patent Application Ser. No. 60/262,811 filed on Jan. 19, 2001, entitled "A New Method For Delivering In-Vehicle Entertainment Services";

U.S. Provisional Patent Application Ser. No. 60/271,578 filed on Feb. 22, 2001, entitled "A New Method And System For Delivering Mobile Direct To Home Entertainment Services"; and U.S. Provisional Patent Application Ser. No. 60/272,741 filed on Mar. 1, 2001, entitled "A New Method And System For Delivering Entertainment To Portable Devices".

BACKGROUND OF THE INVENTION

1. Field of the Invention

The present invention relates generally to broadcasting digital information, and in particular, to a method, apparatus, and article of manufacture for delivering broadcast video programming to wireless personal digital assistants (PDAs) or laptop computers.

2. Description of the Related Art

A significant demand exists to deliver more content to wireless personal digital assistants, laptop computers, and/or handheld personal digital assistants (PDAs). In the prior art, the only video programming available is in the form of short clips and over the air local television broadcasts. However, PDA and laptop users are not able to receive premium cable channels. These problems may be better understood with a description of prior art broadcasting, satellite based systems, and wireless devices.

Digital direct broadcast systems such as DIRECTV®. and DIRECPC™ broadcast via satellite, television programs and information or computer applications, respectively. DIRECTV® broadcasts television programming in a similar fashion to that of terrestrial television. DIRECPC™ subscribers place requests that are queued up and broadcast, to the subscriber's computer. DIRECPC™ services on-demand requests. DIRECTV® and DIRECPC™ incorporate encryption in addressing for applications such as on-demand requests. These systems provide access control where users make selection decisions in advance of the content being broadcast.

The systems described above are all satellite-based systems. That is, each of the systems delivers content directly from a network operations center to a satellite that broadcasts the information to the users. Further, certain cable and satellite video programming (e.g., premium programming such as CNN™ or ESPN™) are not available over terrestrial based systems. Such systems, however, use satellite and cable delivery of video broadcast to primarily fixed users. For example, a satellite-based system requires the placement of a satellite dish on the building in which the service is used. The satellite dishes must be positioned in a location on the building so that they are positioned toward the geostationary satellite generating the broadcast signals. If the "view" to the satellite is blocked by trees or other buildings, the service cannot be used. Also, some consumers view the satellite dishes as not aesthetically pleasing. Further, cable television is not available to wireless receivers.

Mobile devices such as cellular phones and personal digital assistants are increasing their presence in the marketplace. The functionality of such devices is increasing to such applications as the Internet. However, such devices have heretofore been limited to Internet applications.

Satellite connectivity to mobile devices is available in a wireless fashion. However, satellite television reception is not practical for wireless handheld devices due to the excessive cost, large size and complexity of antennas desired, and flexibility for tracking the satellite. Satellite radio is available to smaller wireless receivers. However, satellite radio does not include video programming. In this regard, the only video programming available is in the form of short clips. Therefore, it was previously assumed that no economical method for delivering video programming (e.g., cable-like channels) to mobile devices was practical. In this regard, the prior art fails to provide video programming via terrestrial over-the-air transmissions to the typical wireless TV users.

It would therefore be desirable to provide video programming to mobile devices in a reliable and cost effective manner.

SUMMARY OF THE INVENTION

Embodiments of the invention provide the ability to deliver subscription based cable programming to user devices (e.g., wireless handheld PDAs) via a unique system that leverages existing television broadcast infrastructure. The invention takes advantage of the unused vertical blanking interval (VBI) lines and unused/non-interfering Active lines found in a typical television broadcast. The previously unused lines are combined in an effort to increase the capacity to a practical level required to transmit a premium cable channel to a user device. The added channel is completely transparent to the pre-existing channel that continues to broadcast over the air.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
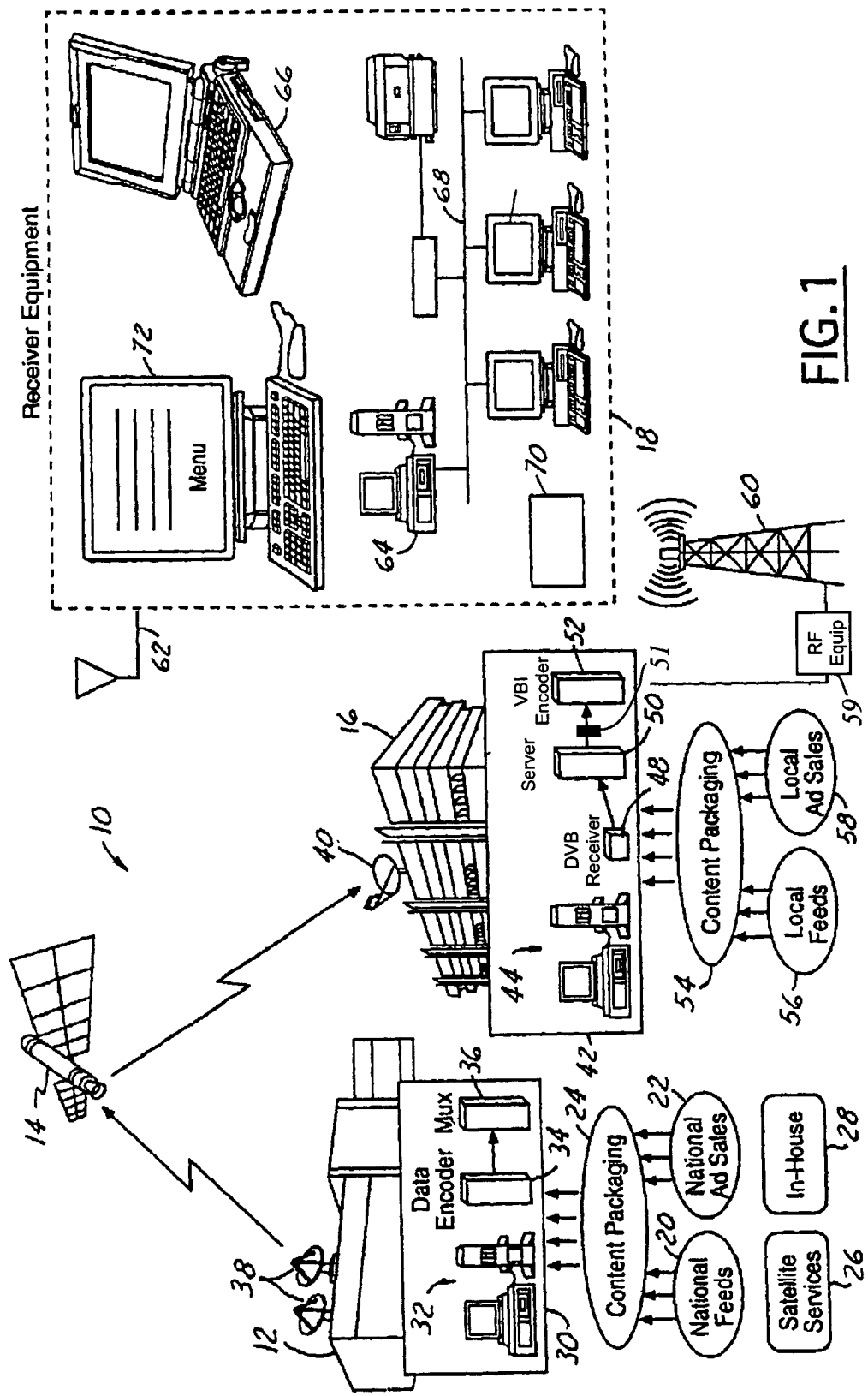
FIG. 1 is a diagrammatic view of the system architecture of a system in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention allow subscription based video broadcasts to wireless handheld personal digital assistants (PDAs) or laptop computers via a unique system approach that uses unused "vertical blanking interval" (VBI) lines and non-interfering "Active" lines to increase the capacity of the broadcast transmission.

DETAILED DESCRIPTION

In the following figures the same reference numerals will be used to identify the same components in the various views.

As described in this application, "electronic content" is meant to encompass various types of digital information including the distribution of video programming, music, videos, movies, music videos, games, advertising and promotional materials associated with the content. "Electronic content" may also include cable-type television programming that includes wide variety of multi-channel content.

Referring now to FIG. 1, electronic content distribution system 10 is illustrated. Electronic distribution system 10 generally has a network operations center (NOC) 12, a satellite 14 in communication with NOC 12, an over-the-air broadcast center 16 that is coupled to users 18 over the air.

The network operations center 12 is coupled to national feeds 20 and national ad sales 22 through content packaging 24. National feeds 20 may, for example, be national "cable" type services channels, premium video channels, or satellite service 26 such as DIRECPC™ or DIRECTV®. The national ad sales 22 may be derived in-house 28 or as will be further described below may be obtained from various promotional ad agencies. A content packaging block 24 is coupled to national feeds 20 and national ad sales 22. The content packaging 24 functions to couple national feeds 20 with national ad sales 22.

The network operations center 12 has a control system that includes various computers 32 (e.g., a computer or small server that is configured to host several applications), a data encoder 34, and a multiplexer 36 that are coupled to antennas 38 that uplink electronic content to satellite 14. The control system 30 operates in a manner known to those skilled in the art. In this regard, the computers 32 may employ a video and audio capture card that converts incoming video and audio data (e.g., from content packaging 24) into a digital format and routes the data forward. In addition, an application that may reside on the host computer/server 32 may include channel and network management for multiple channel distribution and billing information.

A "low bit rate" software compression application may also reside on the host computer/server 32. Such compression software may compress the digital video and audio (i.e., from content packaging 24) to data rates suitable for transmission (e.g., below 180 Kbps for a given channel).

Following the compression, the video and audio information may be converted to Internet Protocol (IP) and routed out of the computer 32 via ether net link to the data encoder 34 (also referred to as digital video broadcast or DVB encoder). The DVB encoder 34 provides an international digital broadcast standard for TV, audio and data. DVB can be broadcast via satellite, cable or terrestrial systems and has been used in Europe and the Far East. In this regard, the DVB encoder 34 may use a DVB standard as a platform to encapsulate the IP information and assign the proper addressing and conditional access functions. An analog 70 MHz Intermedate Frequency (IF) signal may serve as the output of the DVB encoder 34.

Using RF (radio frequency) equipment, the IF signal (e.g., the analog 70 MHz IF signal) may then be QPSK (Quadrature Phase Shift Keying) modulated and routed to a frequency upconvertor that converts the 70 MHz to Ku band frequency. The Ku band frequency may then be routed to a Ku band amplifier. Following amplification, the signal may be routed to antennas 38 such as a large 5 meter Ku band dish that is configured and pointed for transmission to satellite 14.

The geo-synchronous satellite 14 receives the signal and routes the signal back to earth in a bent-pipe fashion to several users (e.g., broadcast centers 16) in the large antenna coverage.

Over-the-air broadcast center 16 has an antenna 40 (e.g., a small dish that is less than 1.8 meters) that receives downlink signals from satellite 14. The downlink signal may pass through a Low Noise Block (LNB) convertor (e.g., within control system 42 or attached to antenna 40) that outputs an L-band frequency.

Over-the-air broadcast center 16 has a control system 42 that comprises a control computer 44, a DVB Receiver 48, a server 50, a Local Area Network Hub 51, and a VBI encoder 52. The L-band frequency is received in the DVB Receiver 48 where the encapsulated IP is removed if the user (if authorized via conditional access) and routed out the back of the receiver 48 (e.g., via Ethernet connection). A personal computer or small server 50 that hosts some unique software receives the Ethernet data.

One of the software applications (referred to as VBI software) that may be loaded onto the computer 50 may configure the data in a specific format that is required by the subsequent VBI encoder 52. Forward error correction (FEC) may also be employed for a more robust link. Another software application (referred to as VBI subscription software) that may also be present on the host computer 50 may allow subscription management and addressing functions.

Additional software may also be loaded on the computer 50 to allow for the injection of local television commercials/ad sales 58 from content packaging 54. In this regard, control system 42 is coupled to content packaging 54, which in turn is coupled to local feeds 56 and local ad sales 58. Thus, the over-the-air broadcast center receives downlink signals from satellite 14 and local advertising content through local ad sales 58.

Within control system 42, as the data leaves the computer 50, it may be routed to a Local Area Network (LAN) Hub device 51 that allows connectivity to the VBI encoder 52. The VBI Encoder box 52 receives the data and encodes the data into the unused VBI portion of the existing television channel (e.g., in lines 10-21). The VBI encoder 52 may also use a portion of the unused Active lines that are currently hidden above and below the typical lines that the viewer can see on a normal television screen. The combination of the unused VBI lines and the unused Active lines may allow the minimum capacity required for an additional television program that can be offered to a wireless subscriber. The added channel is completely transparent to the pre-existing channel that is to be broadcast over the air.

The pre-existing regular television program video (i.e., local feeds 56) are also routed from content packaging 54 through the VBI encoder 52 and combined into one single video output. However, the audio portion for the existing television program 56 may be routed separately (from VBI encoder 52) to an amplifier (e.g., within control system 42).

Thus, as described above, control system 42 receives local channel feeds (also referred to as preexisting television programming) through local feeds 56 and may also provide local advertising content through local ad sales 58. The local feeds 56, local ad sales 58, and downlink signals from satellite 14 are combined in control system 42. Some of the information from satellite 14 may also be stored in server 50 for on-demand broadcasting.

The signals from the VBI encoder 52 and the audio amplifier are received by RF/television transmitter equipment 59 where the signals are modulated onto VHF or UHF carriers and amplified.

Control system 42 is coupled to a wireless transmitter 60 that broadcasts the wireless signals to users 18. Accordingly, the amplified signal from RF equipment 59 is routed to wireless transmitter 60 for broadcasting. Wireless transmitter 60 may comprise a cell tower such as that used in cellular phones, a TV tower/antenna that broadcasts digital signals or a stratospheric platform positioned above a predetermined metropolitan area for broadcasting over-the-air signals. If the wireless transmitter 60 comprises a TV tower, the channels broadcast may be excess channels or bandwidth for a metropolitan area allocated in HDTV format. To allow quick deployment of a system, an HDTV format may not be relied upon. That is, the digital over-the-air content may be incorporated into unused portions of an analog television broadcast, i.e., the vertical blanking interval and/or unused active lines.

Users 18 are coupled to an antenna 62 used for receiving over-the-air broadcast signals. Users 18 may comprise a variety of devices such as a personal computer 64, a laptop computer 66, a network 68 or a hand-held device 70. Each of the devices is preferably coupled to an antenna 62 for receiving over-the-air signals. Each device may have the antenna 62 coupled therein or may be connected to a separate antenna such as that of an automotive vehicle. Hand-held device 70 may comprise a variety of devices such as a digital media receiver, a personal digital assistant, or other type of hand-held device.

Thus, users 18 will receive the normal television signal along with the transparent television signal via computer 64/66 and/or small wireless handheld PDA device 70. The computer 64/66 or handheld device 70 may host software applications that are required to receive the subscriber programming information. For example, the computer 64/66 or handheld device 70 contains television tuning hardware functions required to receive normal over the air broadcasts as well as to pass the transparent VBI and Active line information. VBI software present on the computer 64/66 and handheld device 70, receives the output of the tuner and subsequently decodes the VBI and Active line information. Further, the software may also contain forward error correction (FEC) as well as subscriber management, conditional access, and encryption functions.

After the VBI line data and Active line data are removed from the normal broadcast, the information may be routed to "low bit rate" decompression software. Such decompression software decompresses the sub 180 Kbps data rate and outputs analog audio and video signals to the screen and speaker of the computer 64/66 or handheld device 70. Billing and caching functions may also be available on the computer 64/66 or handheld device 70.

In addition to the above, each device (e.g., computer 64/66 or handheld device 170) associated with user 18 may have a menu 72 or other selection apparatus such as buttons or switches for selecting electronic content broadcast by over-the-air broadcast center 16. Menu 72 may provide information to the user as to the current electronic content being broadcast or may provide an interface to the electronic content stored within the user device.

In operation, the network operations center 12 provides a substantial amount of the content to be broadcast by the over-the-air broadcast center 16. In an actual implementation, very few network operations centers are required. Preferably, only one network operations center 12 is provided. A substantial amount of programming is uplinked to satellite 14. Satellite 14 downlinks various electronic content to over-the-air broadcast centers 16 throughout the country. The over-the-air broadcast center 16 may also combine local content and local ads through local feeds 56 and local ad sales 58.

As described above, users 18 may also be coupled to broadcast center 16. Thus, if on-demand service is desired, broadcast center 16 through telephone wires or through a wireless medium may be contacted so that the broadcast center 16 broadcasts the information through wireless transmitter 60. Broadcast center 16 may track data so that affinity information may be broadcast with the electronic content so that the users may filter the electronic content and store the electronic content on the user devices.

Figure 2:
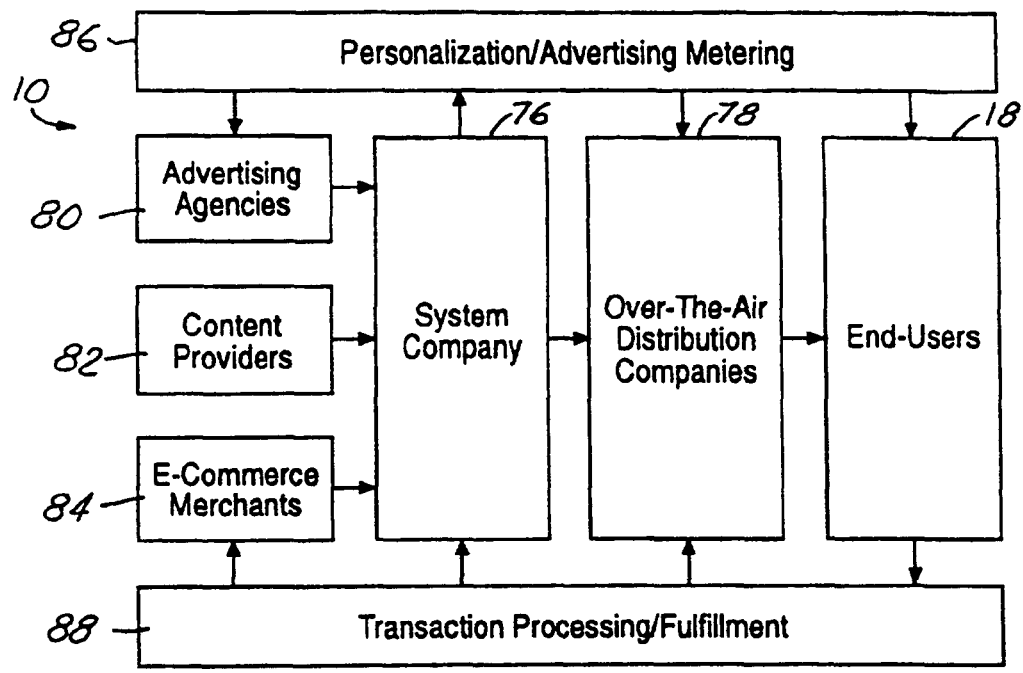
FIG. 2 is a block diagrammatic view of the business interactions in accordance with one or mote embodiments of the invention.

Referring now to FIG. 2, a business level view of an electronic content distribution system 10 is illustrated according to the present invention. The electronic content distribution system 10 is centered around a system company 76. The system company 76 is responsible for the initial broadcast and uplinking of the electronic content. The system company 76 interfaces with over-the-air distribution companies 78. The over-the-air distribution companies 78 may be cellular phone systems, television stations, or may be a company owned system. The over-the-air distribution companies are generally coupled to the end users 18 through the over-the-air broadcast.

System company 76 may also be coupled to various outside sources such as advertising agency 80, content providers 82, and e-commerce merchants 84. The personalization/advertising metering box 86 may represent various aspects of system company, over-the-air distribution and advertising agencies 80. Although illustrated separately, box 86 may be incorporated into these other functions.

Personalization/advertising metering box 86 monitors the transactions by users 18 and helps to formulate an affinity model that is used to provide affinity information along with the electronic content to end users 18 so that material likely to be desirable to the particular end users 18 may be stored at the end users 18. The end users 18 are also coupled to transaction processing/fulfillment box 88. The transaction processing/fulfillment box 88 is shown coupled to system company 76, over-the-air distribution company 78, and e-commerce merchants 84. Although illustrated as a separate box, transaction processing/fulfillment box 88 may be incorporated into system company 76, over-the-air distribution company 78, and e-commerce merchants 84.

It is envisioned that end users 18 may subscribe to a predetermined service such as a television programming package as well as being able to request certain electronic content on demand. This may be done through the menu system as described above. Upon selecting a desired electronic content from the menu, the user device may be coupled to transaction processing/fulfillment box 88 wherein the on-demand service is paid for and wherein the over-the-air distribution system 78 broadcasts the information to the end user 18. The over-the-air distribution system may also be used to provide a decryption key to end users 18 for information stored on the user devices but is encrypted.

Advertising agencies 80 may provide targeted advertising that is coupled to various specific content of content providers 82 to particularly target a specific market.

Figure 3:
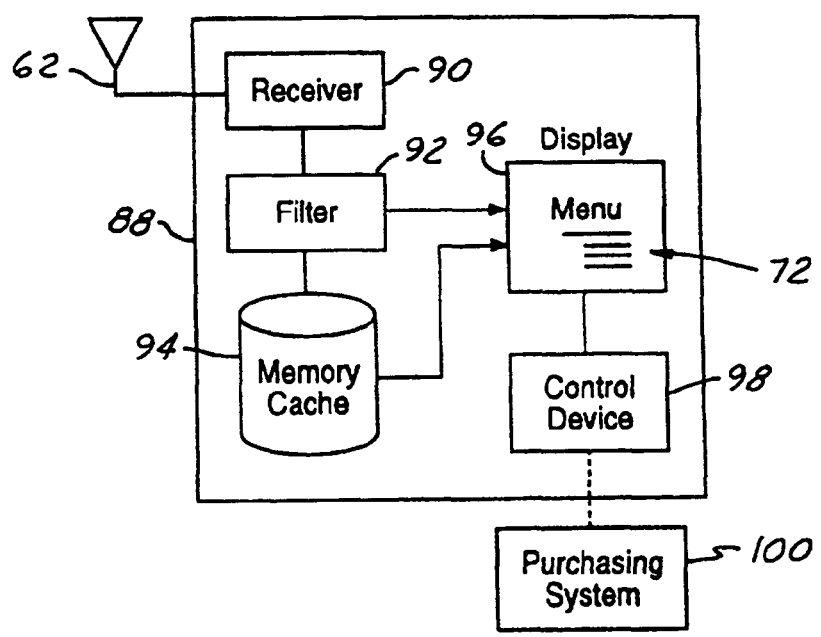
FIG. 3 is a block diagrammatic view of a user device for use in accordance with one or more embodiments of the invention.

Referring now to FIG. 3, one embodiment of a user device 88 is illustrated. Each user device 88 preferably is coupled to an antenna 62 as described above. Antenna 62 is coupled to a receiver 90 that receives the over-the-air signals and converts them into a useful format. Receiver 90 is coupled to a filter 92 that has affinity information of the user therein. Filter 92 is coupled to a memory cache 94. Memory cache 94 and filter 92 are coupled to a display 96 that is used to display menu 72. Thus, receiver 90, filter 92, and memory cache 94 may provide tuning hardware functions required to receive normal over the air broadcasts as well as pass the transparent VBI and Active line information. Devices 90, 92, and 94 may also provide the capability to decode the VBI and Active line information as well as provide forward error correction, subscriber management, conditional access, and encryption functions.

A control device 98 is coupled to display 96 to allow selections of various menu items from memory cache 94. Control 98 may also be used to select streaming content information being received at receiver 93 through filter 92. Control 98 may, for example, be a touch pad, keyboard, touch screen or other device. Control device 98 may also be coupled to the purchasing system 100 such as transaction processing/fulfillment box 88 of FIG. 2 above.

One advantage of the invention is that user device 88 may be mobile or fixed. That is, home users as well as mobile users such as those using hand-held devices or those with laptop computers may benefit from the system. In operation, the over-the-air broadcast center 16 broadcasts a variety of information simultaneously. Receiver 90 receives all the information and through the use of filter 92 decides whether or not to store the information in memory cache 94. The electronic content may be full rights to the electronic content, may be an encrypted form of the electronic content, or may be an indicator for menu 72 that will allow the user to make an on-demand request for the information. Filter 92 has affinity information associated therewith so that the electronic content received by receiver 90 may be screened.

In the simplest form, the broadcast content may be cable TV channels packaged as a service much like the service DirecTV® provides to households. In another embodiment, the broadcast electronic content may contain affinity information so that the filter 92 may compare the broadcast affinity information with the affinity information within the filter and thereby store only the potentially desirable electronic content in memory cache 94. For each item stored in memory cache 94, a menu item is displayed on display 96 so that the user may select the electronic content when desired. In addition, the broadcast content contains information encoded in the VBI and unused Active lines as described above.

If full rights are not given in the electronic content, the control device 98 may select purchasing the device from purchasing system 100. Thus, the receiver 90 may receive the on-demand information and/or a decryption key. The user device through menu 72 and display 96 may be also used to select various over-the-air streaming information from over-the-air broadcast center 16.

After purchasing the electronic content, the information may be provided to advertisers and to the network operations center 12 so that affinity information may be associated with the broadcast information. Data mining techniques may be also used at the network operations center 12 so that various affinity models may be generated to target specific audiences and markets. This information will form an affinity preference model for developing affinity preference models for content downloads. These affinity models may be periodically updated and as well, the filter terms located at the user device may also be updated.

Figure 4:
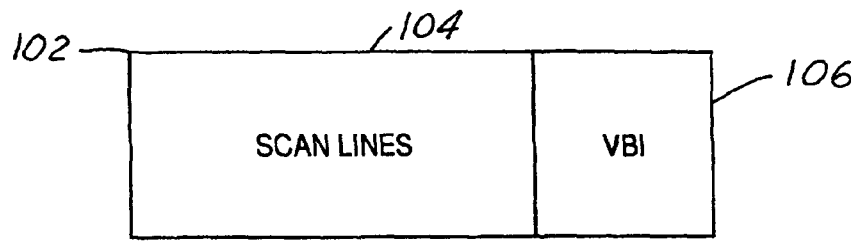
FIG. 4 is a representation of an analog signal having a vertical blanking interval and unused Active lines in accordance with one or more embodiments of the invention.

Referring now to FIG. 4, as mentioned above, over-the-air broadcast center 16 may be used for broadcasting the digital electronic content signals for use with an analog television signal 102. Such a system may be used for simply broadcasting cable-like television channels to portable devices or may include the other functions noted above. The analog television signal 102 is a conventional analog signal having an Active scan line portion or primary channel 104 corresponding to a number of Active scan lines. The Active scan lines correspond to the information used to form the image on the television screen. In addition, there is a portion of the Active scan lines that are unused/non-interfering since they are hidden above and below the typical lines that the viewer can see on a normal television display apparatus.

After the Active scan line portion 104, a vertical-blanking interval 106 is commonly broadcast. The vertical blanking interval 106 is essentially a pause before the next television signal with another set of Active scan lines and vertical blanking interval 106 is broadcast. The vertical blanking interval used in current analog systems typically employ about 24 scan lines. In this regard, the invention may utilize the unused portion of the VBI which are commonly lines 10-21. As mentioned above, the television signal 102 is an analog signal. Although an over-the-air analog signal has been described, the present invention may also be used in the vertical blanking interval (and unused Active scan lines) of a digital satellite broadcast signal which will be described further in FIG. 12.

The present embodiment seeks to include electronic content (such as an additional channel or programming) in digital format using the vertical blanking interval 106 and unused/non-interfering portion of the Active scan lines 104. The digital signal is therefore superimposed upon the analog television signal 102. The electronic content during this time may also be referred to as a secondary channel.

Figure 5:
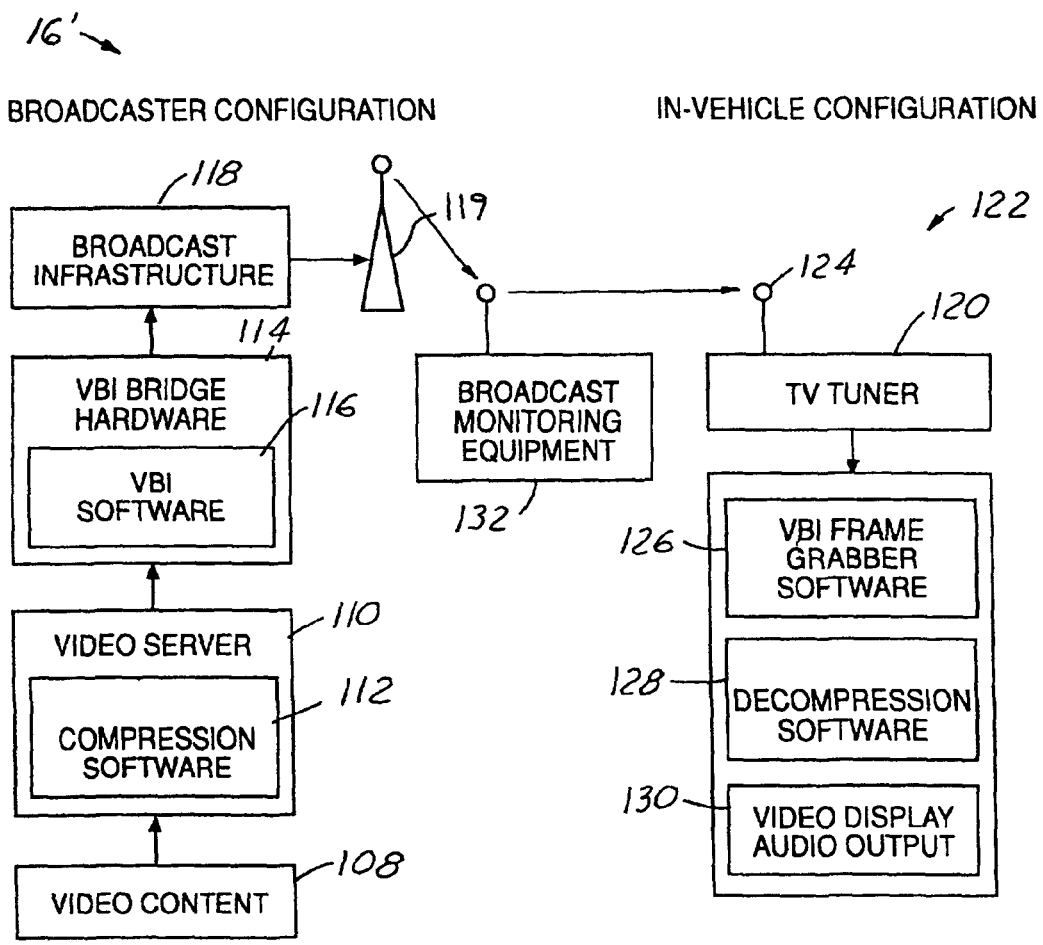
FIG. 5 is a high level block diagrammatic view of a broadcast system for vertical blanking interval unused Active lines in accordance with one or more embodiments of the invention.

Referring now to FIG. 5, a second embodiment of an over-the-air broadcast center 16' is illustrated. In this embodiment, video content, whether local or through a satellite such as the one illustrated in FIG. 1, is provided to over-the-air broadcast center 16'. Video content 108 is provided to a video server 110 that has video compression software 112 therein. Any video compression may be utilized. For example, a suitable video compression may use MPEG 4 compression software 112. Such software is known to those skilled in the art. The digital video content 108 is then compressed by software 112 and provided to vertical blanking interval bridge hardware 114. Vertical blanking interval bridge hardware 114 may include vertical blanking interval software 116 which is used to superimpose the compressed digital signal onto the vertical blanking interval and unused Active lines of the broadcast television signal. The combined signal is coupled to broadcast infrastructure 118 where the combined signal is then transmitted over the air with a broadcast antenna 119. Broadcast infrastructure 118 and antenna 119 may have components of the type described above in FIG. 1. Using such a standard high-speed vertical blanking interval (and unused Active lines) combined with advanced compression (e.g., MPEG 4) techniques, the present invention may exceed any required capacity (e.g., of approximately 100 kbps).

A mobile device 122 capable of receiving the over-the-air broadcasts from broadcast antenna 119 is illustrated. Mobile device 122 may be one of the numerous devices described above in connection with FIG. 3. Exemplary devices include a personal digital assistant or a cellular phone. The present invention includes circuitry to receive the electronic content in addition to the functions of the device. For example, a personal digital assistant may still have calendaring and contact information as well as providing a display screen for displaying the received digital broadcast signal. A cellular phone, for example, may also include the capability of receiving telephone signals as well.

To carry through with the vertical blanking interval (and unused Active lines) electronic content broadcast by broadcast infrastructure 118, an antenna 124 may be used to receive the entire broadcast television signal from antenna 119. This entire television signal includes both the regular broadcast channel as well as the digital electronic content embedded within the vertical blanking interval and unused Active lines. A TV tuner 120 is incorporated into the mobile device 122 so that selections of different programming may be accomplished. Vertical blanking interval frame grabbing software 126 is used to receive a compressed digital video signal transmitted within the vertical blanking interval and unused Active lines of the broadcast signal. The frame grabbing software 126 is coupled to decompression software 128 to decompress the compressed video signal. The decompressed video signal from decompression software 128 is displayed on an output device 130. Decompression software 128 may also include conditional access software. Conditional access software allows for only authorized viewing of the digital content on a memory. Such conditional access may be software coded into the device or provided on a separate card in a manner similar to that of the DIRECTV® system. Speakers may also be incorporated into output device 130 to provide audio simultaneously with the video.

Advantageously, the present invention allows over-the-air broadcast signals to act as a carrier for the digital electronic content desired to be provided to mobile users. While the emphasis is on mobile users, stationary users may also be serviced by such a system.

Monitoring equipment 132 may also be incorporated into the system. The monitoring equipment 132 provides feedback to the broadcast center corresponding to the quality of the signals so that adjustments may be made.

Figure 6:
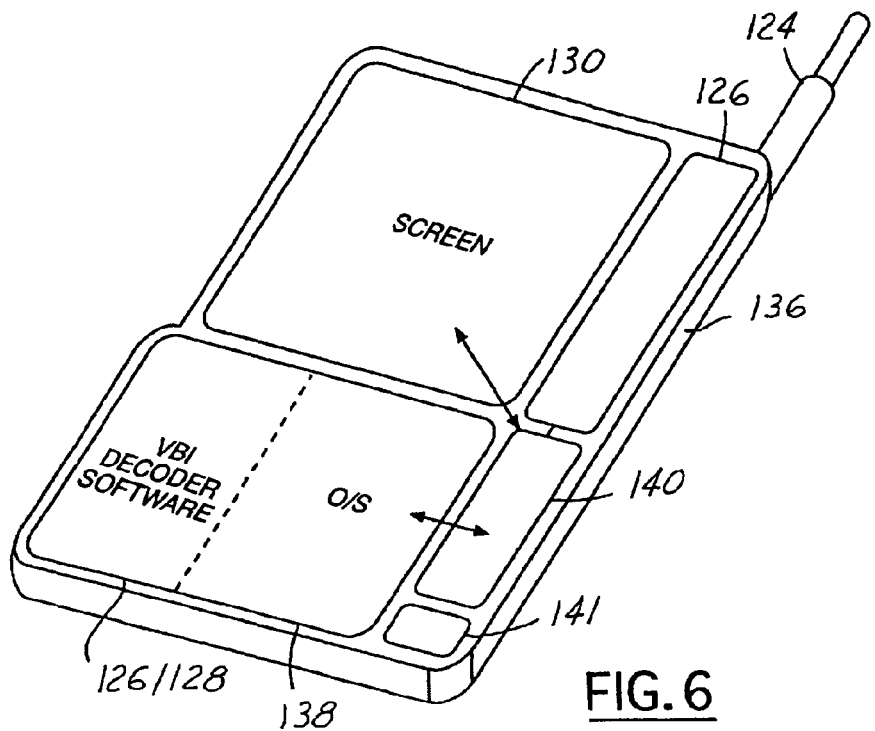
FIG. 6 is a block diagrammatic view of a personal digital assistant having vertical blanking interval and unused Active lines reception in accordance with one or more embodiments of the invention.

Referring now to FIG. 6, a personal digital assistant 136 having the features according to the present invention are illustrated in a block diagrammatic form. The same reference numerals are used to illustrate the same components from FIG. 5. Personal digital assistant 136 has an operating system 138, which may be separate from the present invention. However, those skilled in the art will recognize that operating system 138 may include vertical blanking interval frame grabber software 126 and decompression and conditional access software 128 as a part thereof, as illustrated. Operating system 138 is coupled to various architectural elements 140 depending on the type of system. Architecture elements 140 are coupled to antenna 124 and to TV tuner 126. TV tuner 126, as above, allows the user to select the desired electronic content to be viewed on display 130. TV tuner 126 is thus coupled between architecture elements 140 and display 130. Architecture elements 140 may, for example, include an input device such as knobs, buttons, or switches for allowing the selection of various electronic content.

A power source 141 may also be included on the device. Power source 141 may be a battery or a rechargeable battery. This allows personal digital assistant 136 to be mobile. In addition to batteries, personal digital assistant 136 may also be powered with an AC adapter.

Figure 7:
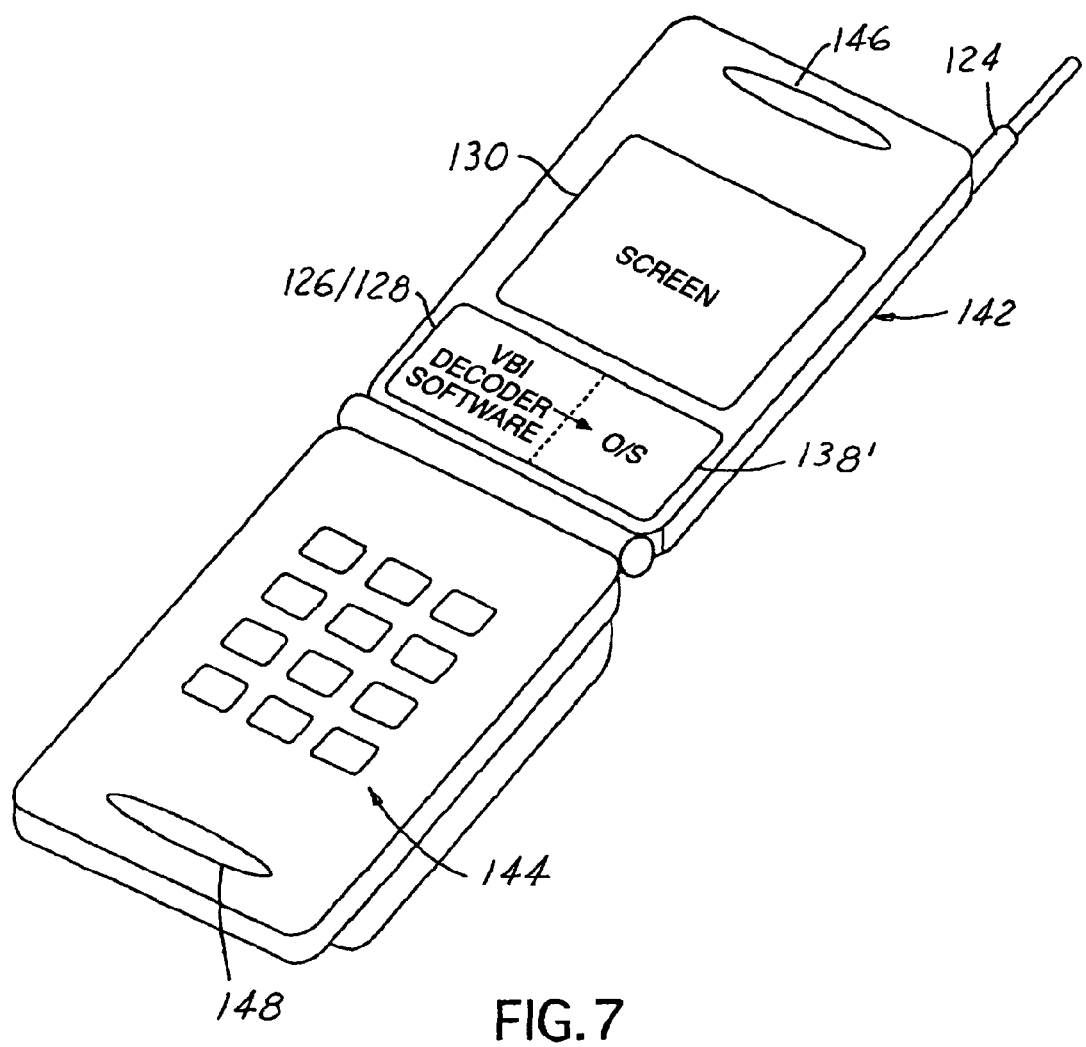
FIG. 7 is a block diagrammatic view of a cellular phone having a vertical blanking interval and unused Active lines reception in accordance with one or more embodiments of the invention.

Referring now to FIG. 7, a cellular phone 142 is illustrated having the broadcast reception capability described above. In this embodiment, cellular phone 142 has an operating system 138' that supports the traditional cellular phone elements as well as those described above with respect to FIG. 6. Cellular phone 142 may also include a touch pad 144, an ear speaker 146, and a microphone 148 to support the cellular phone application.

Figure 8:
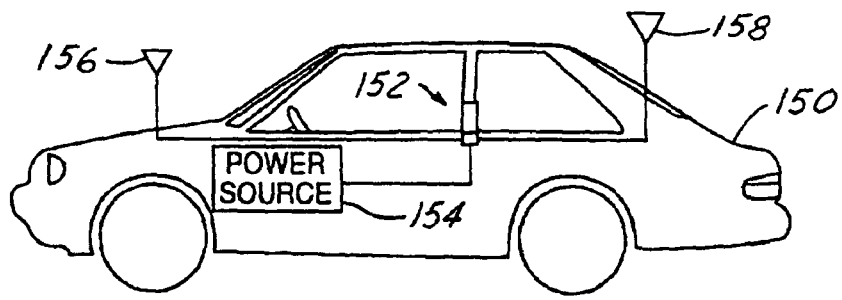
FIG. 8 is a block diagrammatic view of an automotive vehicle having a mobile device in accordance with one or more embodiments of the invention.

Referring now to FIG. 8, the present invention may be suited for mobile use such as in an automotive vehicle 150. Automotive vehicle 150 may incorporate a mobile device 152 therein. Mobile device 152 may be coupled to a vehicle power source 154 such as the vehicle battery. Also, mobile device 152 is preferably coupled to a first vehicle antenna 156 and preferably to a second vehicle antenna 158.

Figure 9:
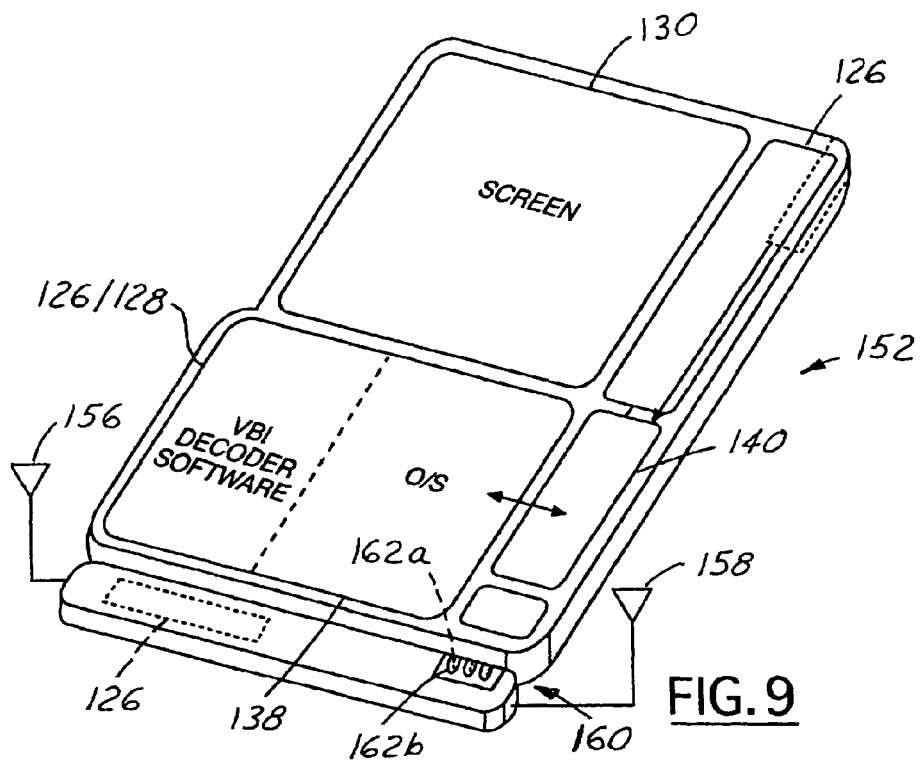
FIG. 9 is a more detailed block diagrammatic view of a mobile device according to FIG. 8.

Referring now also to FIG. 9, the same reference numerals are used to identify the same components from that of FIG. 6. Mobile device 152 may be coupled in a cradle 160. Cradle 160 may be coupled to vehicle power source 154 and to antennas 156 and 158. A connector 162 having a male portion 162A and a female portion 162B may be respectively coupled on mobile device 152 and connector 162. As illustrated, mobile device 152 is removable from cradle 160. However, in some automotive applications, mobile device 152 may be coupled fixedly to cradle 160. Cradle 160 may also have other electrical circuitry therein used for operating mobile device 152. As illustrated in dashed lines, TV tuner 126 may also be incorporated into cradle 160. Such a device would be suitable for a removable portable digital assistant wherein only the television tuner aspects are desired when mounted within cradle 160.

Figure 10:
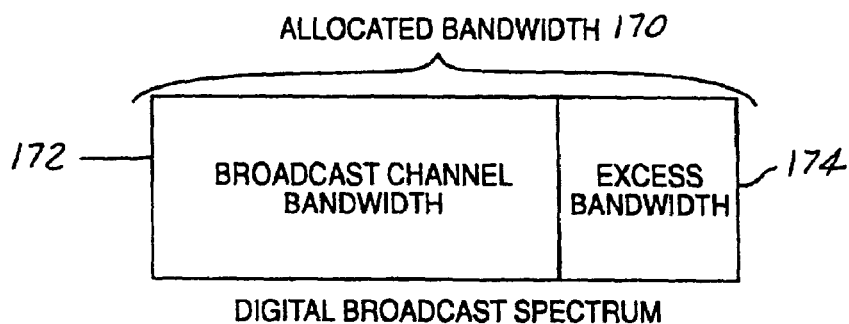
FIG. 10 is a representation of an allocated bandwidth for high definition television in accordance with one or more embodiments of the invention.

Referring now to FIG. 10, the present invention may also be suitable for use in an HDTV broadcasting environment. Governmental bodies have regulated the HDTV environment by providing an allocated bandwidth 170. The allocated bandwidth for a channel in the United States is 6 MHz. The allocated bandwidth 170 is less than the broadcast channel bandwidth 172 over which the television stations will broadcast the television signal. Thus, excess bandwidth 174 remains.

Figure 11:
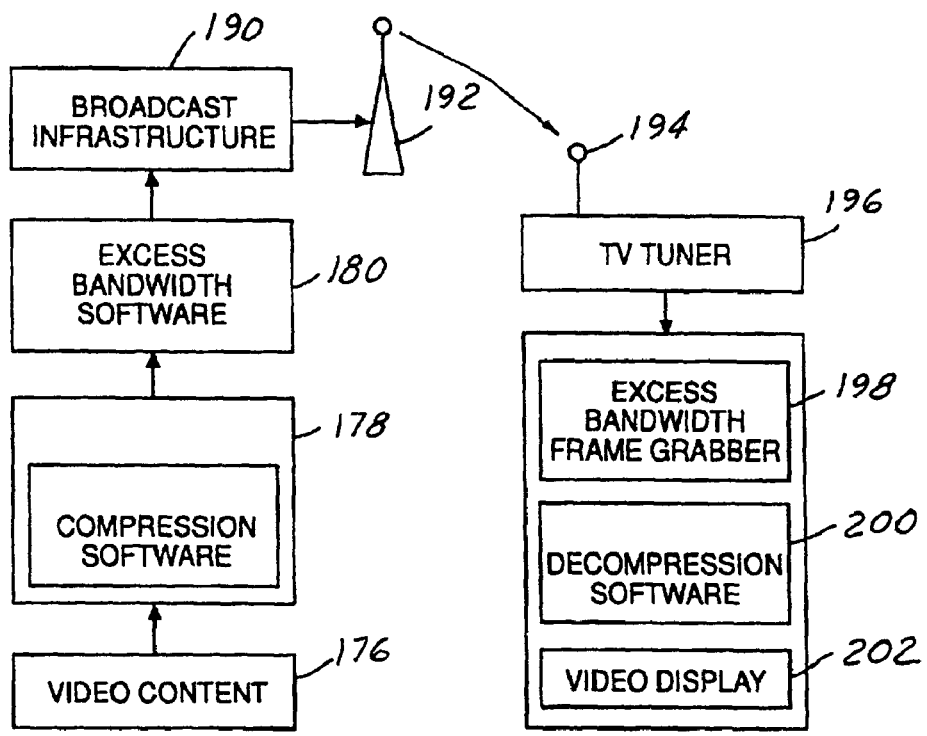
FIG. 11 is a block diagrammatic view of a broadcast and reception system in accordance with one or more embodiments of the invention for use with a high definition television system.

Referring now also to FIG. 11, a similar figure to that of FIG. 5 except rather than broadcasting over the vertical blanking interval and unused Active lines, the excess bandwidth of the allocated bandwidth for a digital television signal is utilized to broadcast the digital signal. In this embodiment, video content 176 is provided to compression software 178. Excess bandwidth software is used to couple the regularly broadcast signal with the electronic content. Both signals are broadcast through broadcast infrastructure 190 through antenna 192. A receiving antenna 194 coupled to TV tuner 196 is used to receive the electronic content signal. An excess bandwidth frame grabber 198 grabs the electronic content from the excess bandwidth and provides it to decompressor 200. The decompressed video content is displayed on display 202 in a similar manner to that described above. Decompressor 200 may also include conditional access software as described above.

In operation, the system operator uplinks a plurality of electronic content packages to a satellite. These electronic content packages are preferably a subscriber type package such as that provided by DIRECTV® service. Preferably, at least a portion of the electronic content packages is common throughout the region or country. The electronic content packages are received from the satellite by the various over-the-air broadcasters. The over-the-air broadcasting broadcasts their regular signals and in addition, the digital electronic content. In the case of an analog television channel, the digital signal is superimposed over the vertical blanking interval of the signal. In the case of an HDTV signal, the digital content is provided in the excess bandwidth. The electronic content packages are received in a user appliance or device where either the analog signal or the HDTV signal is preferably disregarded except for the electronic content packages. Purchasers of the service are granted access by purchasing the conditional access software either directly (e.g. in a format card) or indirectly (e.g. purchasing an enabled device). Thus, the electronic content packages are granted access to, decompressed and displayed on the display device and any audio signals are heard through any speaker device incorporated within the user device.

Figure 12:
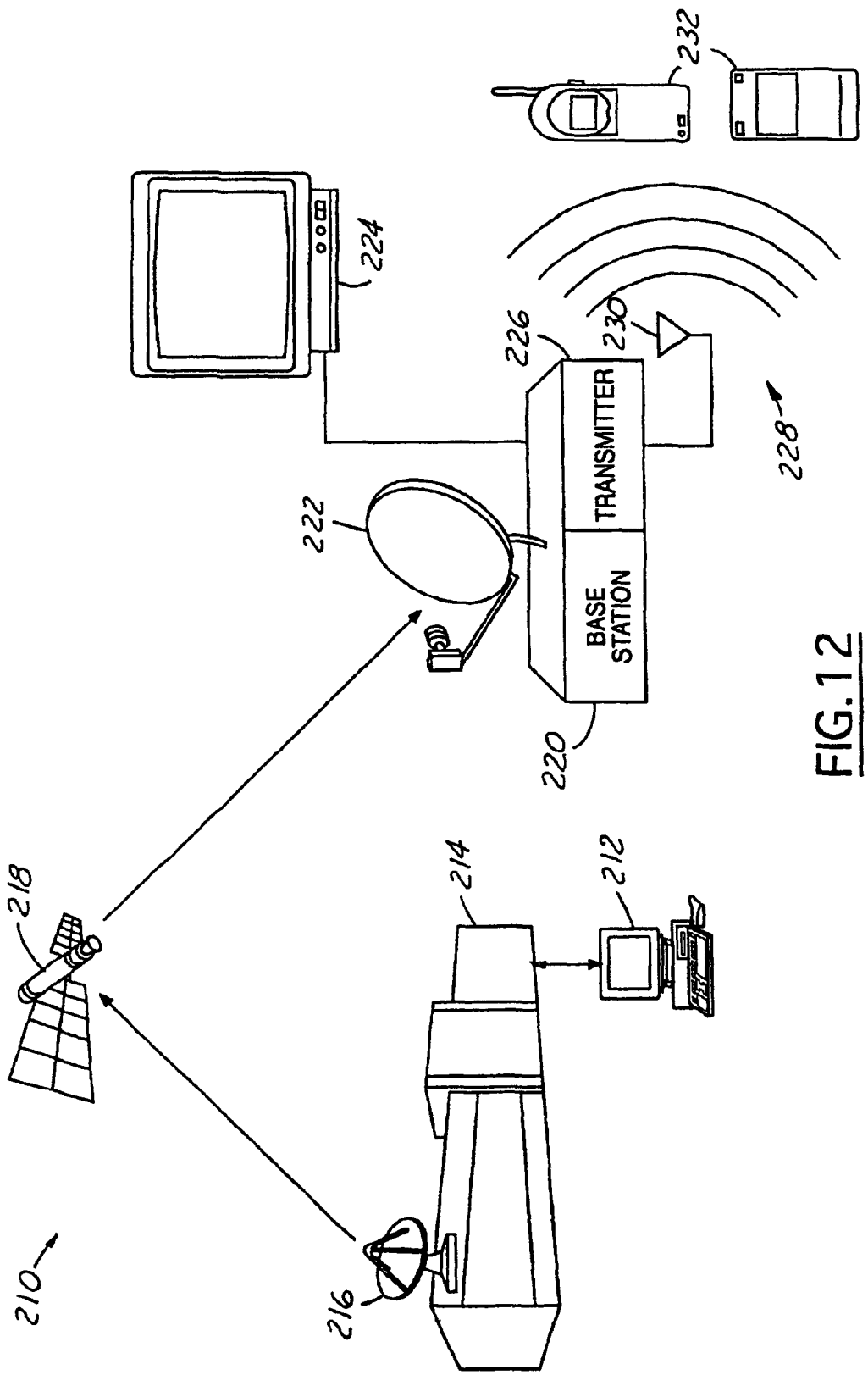
FIG. 12 is an alternative block diagrammatic view of a system in accordance with one or more embodiments of the invention.

Referring now to FIG. 12, another embodiment of the present invention is illustrated. The present invention may also be embodied in various types of content delivery systems such as a direct broadcast satellite system 210. In addition, a cable network or fiber optic network may also be used. The following description is directed to a direct broadcast satellite content delivery system. That is, a satellite may be used to broadcast both a primary channel and a secondary channel during the vertical blanking interval of the primary channel as mentioned above. System 210 has feeds 212, which are a simplified version of those shown above in FIG. 1. Feeds 212 are meant to be inclusive of various types of feeds including local feeds and cable-type broadcast feeds. The feeds 212 are coupled together at broadcast center 214. The broadcast center 214 organizes the signal and directs the television signals through an antenna 216 to a satellite 218. The broadcast center thus organizes the signals into primary channels, which contain a substantially greater amount of digital information than the secondary channel broadcast during the vertical-blanking interval and unused Active lines of the primary channel.

Satellite 218 broadcasts the primary channel and the vertical blanking interval/unused Active line secondary channel to a particular service area. In a cable or fiber optic system the primary and secondary channels are delivered via a cable or fiber optic cable rather than satellite 218.

A base station 220 having a receiving antenna 222 is illustrated receiving both the primary channel and the secondary vertical broadcast interval/unused Active line channel. Base station 220 represents a variety of potential types of base stations. Base station 220 may, for example, be similar to that of a set top box for the DIRECTV® systems. Base station 220 is coupled to a television 224 in a conventional manner. Preferably, television 224 receives the primary channel from base station 220. In a cable or fiber optic system, base station 220 may be connected to the cable or fiber optic cable directly.

Base station 220 may also include a transmitter 226 which is used to form a local area wireless network 228 between a transmitting antenna 230 and user devices 232. Preferably, the secondary or vertical blanking interval/unused Active line channel is transmitted to the user devices 232 in a wireless manner. Transmission may take place using standard formats such as the Bluetooth format for wireless devices. The user devices 232 include similar types of devices illustrated in FIGS. 6 and 7 such as cellular phones and personal digital assistants. Of course, those skilled in the art will recognize that various types of wireless devices configured to receive the frequencies broadcast by transmitter 226 may be employed.

Various uses for such a system will be evident to those skilled in the art. One use envisioned for such a device is for residential use so that both the primary channel may be enjoyed by watching television 224 while users throughout the house and nearby surroundings may enjoy the secondary channel broadcast during the vertical-blanking interval and unused Active lines of the primary channel. Other uses include public buildings and public transportation. A base station may be employed on the building or public transportation to receive at minimum the secondary channel within the vertical blanking interval and unused Active lines and rebroadcast the secondary channel to the mobile wireless devices. Examples of suitable public places include airports, shopping malls, arenas, subways, trains, buses and the like.

Figure 13:
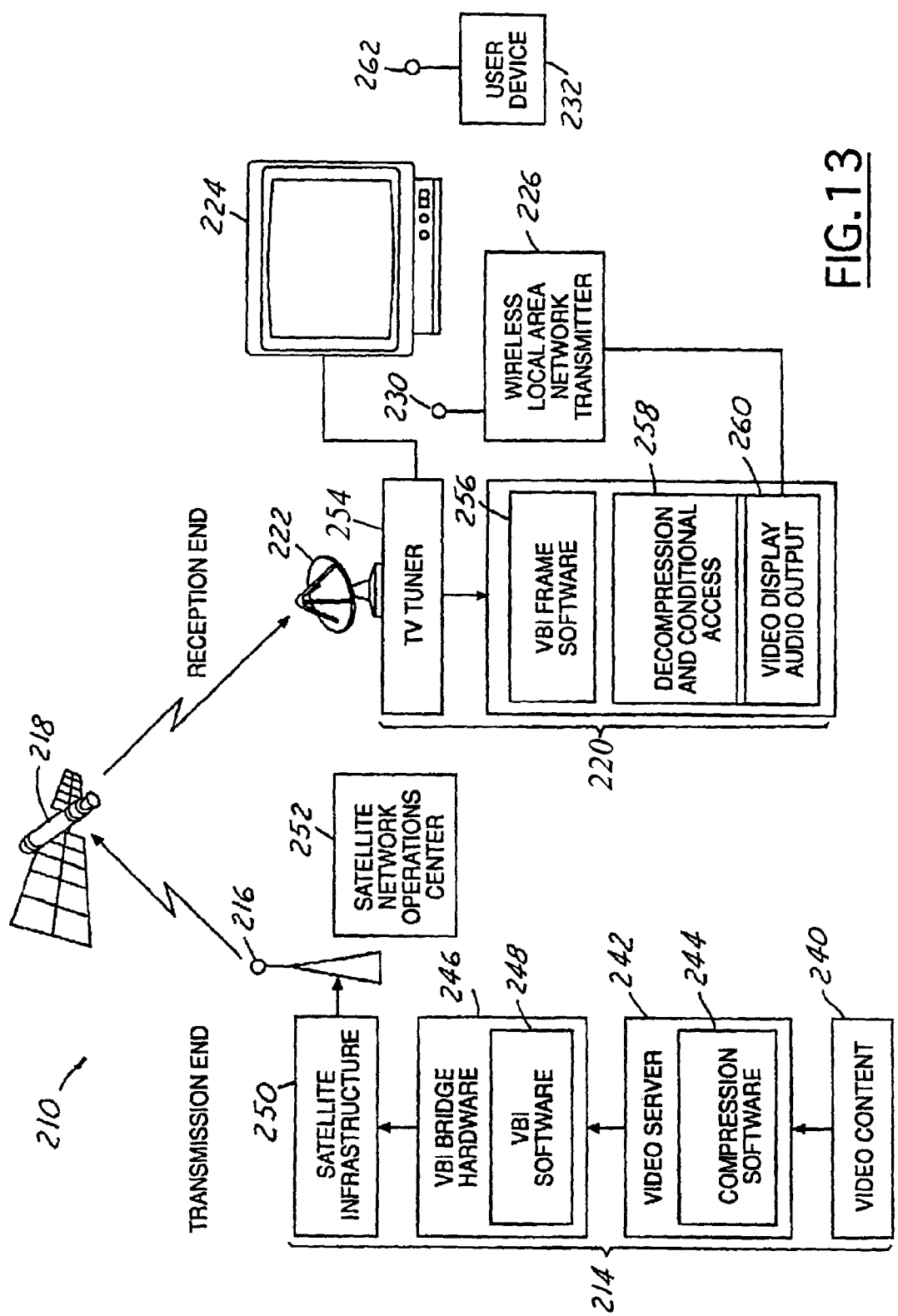
FIG. 13 is a more detailed block diagrammatic view of a system in accordance with one or more embodiments of the invention.

Referring now to FIG. 13, a more detailed block diagram of a broadcast system 210 is illustrated. FIG. 13 uses the same reference numerals for the same components as FIG. 12. Broadcast center 214 has similar content to FIG. 5. That is, video content 240 is provided to a video server 242 that has video compression software 244 therein. Similar video compression may be used as mentioned above with respect to software 112. The digital video content to be placed within the vertical blanking interval and unused Active lines of the satellite broadcast signal is provided to vertical blanking interval bridge hardware 246 having vertical blanking interval software 248 therein. Vertical blanking interval software 248 is used to superimpose the compressed digital electronic content signal into the vertical blanking interval and unused Active lines of the digital broadcast television signal. Vertical blanking interval bridge hardware 246 is coupled to satellite infrastructure 250 rather than broadcast infrastructure 118 as illustrated in FIG. 5. Thus, the vertical blanking interval and unused Active lines of the digital broadcast satellite signal are transmitted from satellite infrastructure 250 through antenna 216 to digital broadcast satellite 218.

A satellite network operation center 252 may be employed to control the movement and quality of the signals broadcast from the satellite 218. Broadcast center 214 in addition to the structure illustrated in FIG. 13 broadcasts the digital broadcast signal in a conventional manner with the addition of the secondary or vertical broadcast interval/unused Active line channel therein.

Base station 220 includes antenna 222 for receiving the digital satellite broadcast signals described above. A tuner 254 may also be included therein for tuning various channels received through the digital broadcast signal. TV tuner 254 may include various numbers of individual tuners for the use of multiple users. The multiple users may include directly connected users such as a television 224 or mobile user devices 232. TV tuner 254 may also be configured to receive both primary and secondary broadcast channels. At minimum, TV tuner 254 is configured to receive secondary digital broadcast signals.

TV tuner 254 is coupled to vertical blanking interval frame software 256 which is used to receive the compressed digital video signal transmitted within the vertical blanking interval and unused Active lines of the digital broadcast signal. Vertical blanking interval frame software 256 is coupled to decompression and conditional access software 258. As mentioned above, the present system may be a subscription type service, which will be restricted through conditional access as described above. The electronic content forming the secondary channel is thus decompressed and allowed access to through decompression and conditional access software 258.

Video display and audio output 260 thus receives the electronic content forming the secondary channel which is then coupled to a wireless local area network transmitter 226. Wireless local area network transmitter 226 uses an antenna 230 to locally distribute the video display and audio output 260 to the user devices 232 using antenna 230 on the wireless local area network transmitter 226 and antenna 262 on user device 232. As mentioned above, wireless local area network preferably transmits the secondary channel using standard wireless technology such as Bluetooth or the 802.11 type interface. Preferably, the secondary channel has less digital video content that is suitable for retransmission to mobile devices. Typically, mobile devices do not include the processing power of high level devices such as set top boxes. Because mobile devices are smaller, the amount of content and thus the corresponding digital bits can be a lot smaller without losing the effect. This embodiment may also include another type of a high altitude communication device such as a stratospheric platform rather than a satellite. However, it is envisioned that a satellite will be more useful and reach more users than a stratospheric platform.

In operation, a primary channel having digital electronic content such as a secondary channel during a vertical blanking interval and/or unused Active lines of the primary channel is uplinked to the high altitude communication device such as a satellite. The primary channel having the digital electronic content is received and over-the-air broadcast to the user devices where it is received, displayed, or heard. Preferably, a base station such as a set top box for the DIRECTV® system is modified to include the wireless local area network system described above. Such a system will provide an additional service for DIRECTV® users who require mobility.

In addition to the above, an alternate embodiment of the invention may provide for the use of a PC-like plug-in card (referred to as a receiver card) for receiving and enabling use/display of the digital content in the VBI and/or unused active lines (e.g., by a wireless subscriber). Such a receiver card may slide into equipment such as a computer laptop or PDA device. The receiver cards enable reception of the digital information in the VBI and/or unused Active lines by wireless users. Most PDAs and computer laptops provide PCMCIA (Personal Computer Memory Card International Association) and Flash card interfaces. Embodiments of the invention may be configured for accommodation by such interfaces. Accordingly, embodiments of the invention may be configured to interface with PCMCIA and other types of interfaces while other embodiments may interface with a Flash card or similar type of interface. Additional details that further describe the use of such receiver cards are provided in U.S. Utility application Ser. No. 10/409,875, filed Apr. 9, 2003, by Erin H. Sibley and Paul Damian Tarbuck, entitled "RECEIVER CARD TECHNOLOGY FOR A BROADCAST SUBSCRIPTION VIDEO SERVICE".

Logical Flow

Figure 14:
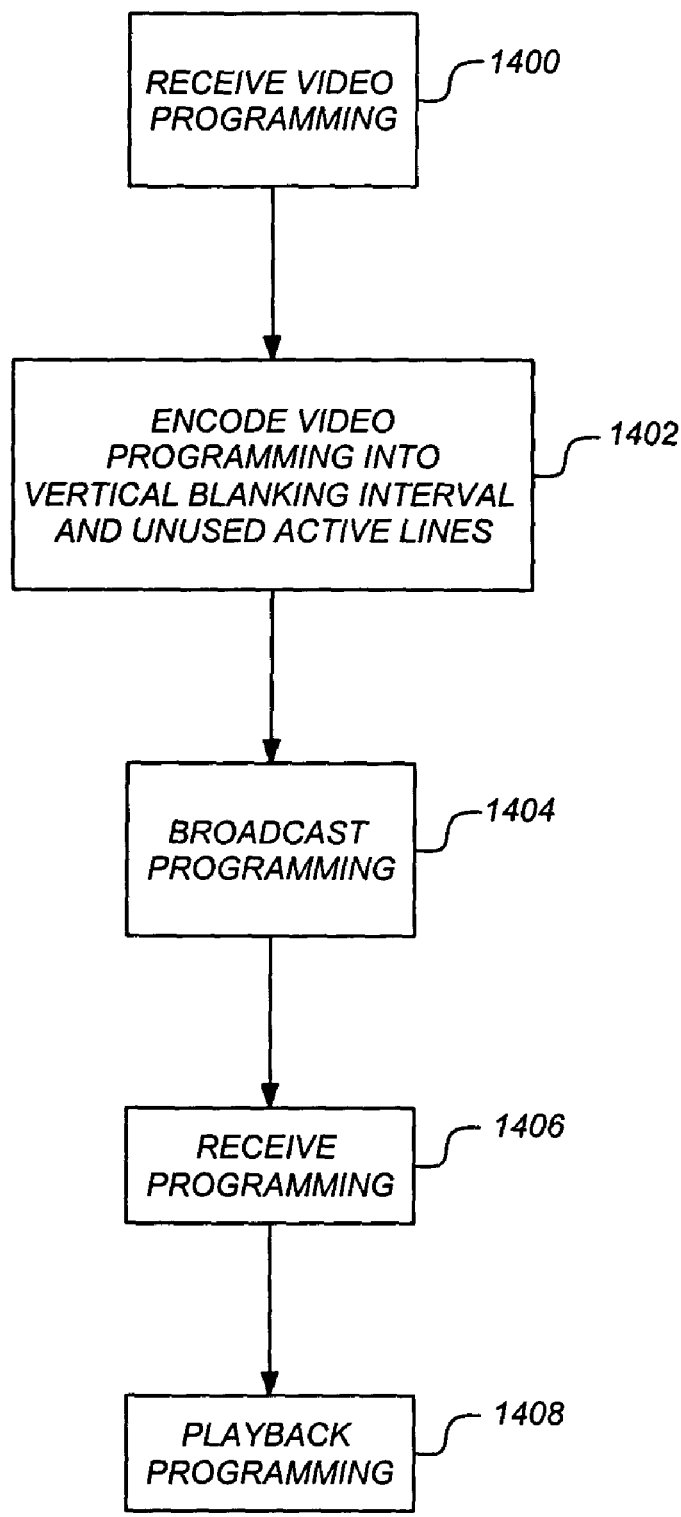
FIG. 14 is a flow chart illustrating the logical flow for processing video programming in accordance with one or more embodiments of the invention.

FIG. 14 is a flow chart illustrating the logical flow for delivering cable channels to handheld devices in accordance with one or more embodiments of the invention. At step 1400, video programming is received. Such video programming may be received in a over-the-air broadcast center via satellite broadcast from a network operations center. In this regard, premium video channels may be compressed, processed, encoded, converted, etc. at a network operations center for transmission via satellite. The satellite receives the signal and routes the signal to the over-the-air broadcast center where it is received at step 1400.

The video programming received may then need to be processed for encoding and transmission. Thus, at step 1402, the video programming is encoded into the vertical blanking interval (VBI) and unused/non-interfering Active lines of a pre-existing television channel. Further information may also be encrypted such as subscription management and addressing functions. The unused Active lines containing the encoded information are Active lines that are hidden above and/or below the typical lines that a viewer can see on a normal television screen. The combination of the unused VBI and unused Active lines may provide the minimum capacity required for an additional television program (e.g., a premium cable channel) that can be offered to a wireless subscriber. Such an additional channel is completely transparent to the pre-existing channel that is broadcast over the air. The encoding may also provide for combining the pre-existing television channel and VBI/unused Active lines into one single video output (audio output may be routed separately to an amplifier).

The encoded video and audio are received at transmitter equipment and modulated onto VHF and/or UHF carriers and amplified. Thereafter, the amplified signal may be routed to a television antenna tower where the terrestrial broadcast is sent to all users within range at step 1404.

Once broadcast, the normal television signal (along with the transparent television signal) may be received at a user device such as a computer or small wireless handheld device (e.g., a personal digital assistant [PDA]) (e.g., using a receiver card) at step 1406. The user device contains various functionality including the ability to manage received subscriber programming information (e.g., that is broadcast). The user device may also contain television tuning hardware functions (e.g., in a receiver card or other modules) required to receive the normal over-the-air broadcasts as well as to pass the transparent VBI and unused Active line information. VBI software on the user device may receive the output from the tuning hardware and decode the VBI and unused Active line information. Such software may also contain forward error correction (FEC) as well as subscriber management, conditional access, and encryption functions.

After the VBI and unused Active line data are removed from the normal broadcast, the information may be routed to decompression software which outputs the analog audio and video signals to the screen and speaker of the user device at step 1408. In addition, billing and caching functions may be available on the user device.

In view of the above, the present invention advantageously uses the previously unused digitally vertical blanking interval and unused Active lines of a normal broadcast signal. Further, handheld devices are now capable of receiving over-the-air broadcasts of proprietary signals.

CONCLUSION

This concludes the description of the preferred embodiment of the invention. However, the foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for providing broadcast video programming, comprising:
   (a) receiving video programming;
   (b) encoding the video programming into a vertical blanking interval and unused Active lines of a television channel;
   (c) broadcasting the television channel and encoded video programming in the vertical blanking interval;
   (d) receiving the broadcast encoded video programming in the vertical blanking interval in a user device, wherein the user device comprises:
      (i) a mobile portable handheld device;
      (ii) tuning hardware configured to receive normal over-the-air terrestrial broadcasts and to pass the encoded video programming in the vertical blanking interval;
      (iii) vertical blanking interval software configured to:
         (1) receive output from the tuning hardware; and
         (2) decode the encoded video programming from the vertical blanking interval;
      (iv) a screen and a speaker; and
      (v) decompression software configured to:
         (1) decompress the decoded video programming; and
         (2) output analog audio and video signals from the decoded video programming to enable a user to watch the video programming on the screen and speaker of the user device.

2. The method of claim 1, wherein the unused Active lines comprise Active lines that are hidden above and below typical lines that a viewer can see on a normal television screen.

3. The method of claim 1, wherein the encoded video programming is completely transparent to the television channel that is broadcast.

4. The method of claim 1, wherein the encoded video programming comprises a premium cable channel.

5. The method of claim 1, further comprising receiving the broadcast encoded video programming in a wireless device.

6. The method of claim 5, wherein the wireless device comprises a receiver card for receiving the broadcast encoded video programming.

7. The method of claim 1, wherein the vertical blanking interval software further comprises subscriber management, conditional access, and encryption functions to control access to the video programming in the vertical blanking interval and unused Active lines.

8. A user device for processing video programming comprising:
   (a) a mobile portable handheld device;
   (b) tuning hardware configured to receive normal over-the-air terrestrial broadcasts and to pass the encoded video programming, wherein the encoded video programming is encoded in a vertical blanking interval and unused Active lines of a broadcast television channel;
   (c) a screen and speaker; and
   (d) software configured to:
      (i) decode the encoded video programming from the vertical blanking interval; and
      (ii) output the decoded video programming to enable a user to watch the video programming on the screen and speaker of the user device.

9. The user device of claim 8, wherein the unused Active lines comprise Active lines that are hidden above and below typical lines that a viewer can see on a normal television screen.

10. The user device of claim 8, wherein the encoded video programming is completely transparent to the television channel that is broadcast.

11. The user device of claim 8, wherein the encoded video programming comprises a premium cable channel.

12. The user device of claim 8, wherein the user device is a wireless device.

13. The user device of claim 12, wherein the wireless device comprises a receiver card for receiving the broadcast encoded video programming.

14. The user device of claim 8, wherein the software comprises:
   (b) vertical blanking interval software configured to:
      (i) receive output from the tuning hardware; and
      (ii) decode the encoded video programming;
   (c) decompression software configured to:
      (i) decompress the decoded video programming; and
      (ii) output analog audio and video signals to a screen and speaker of the user device.

15. The user device of claim 8, wherein the software comprises subscriber management, conditional access, and encryption functions to control access to the video programming in the vertical blanking interval and unused Active lines.

* * * * *